3 Sheets--Sheet 1.
M. J. STEIN.
Improvement in Apparatus for Rendering and Drying Animal Matters, and Burning the Gases.
No. 125,854. Patented April 16, 1872.
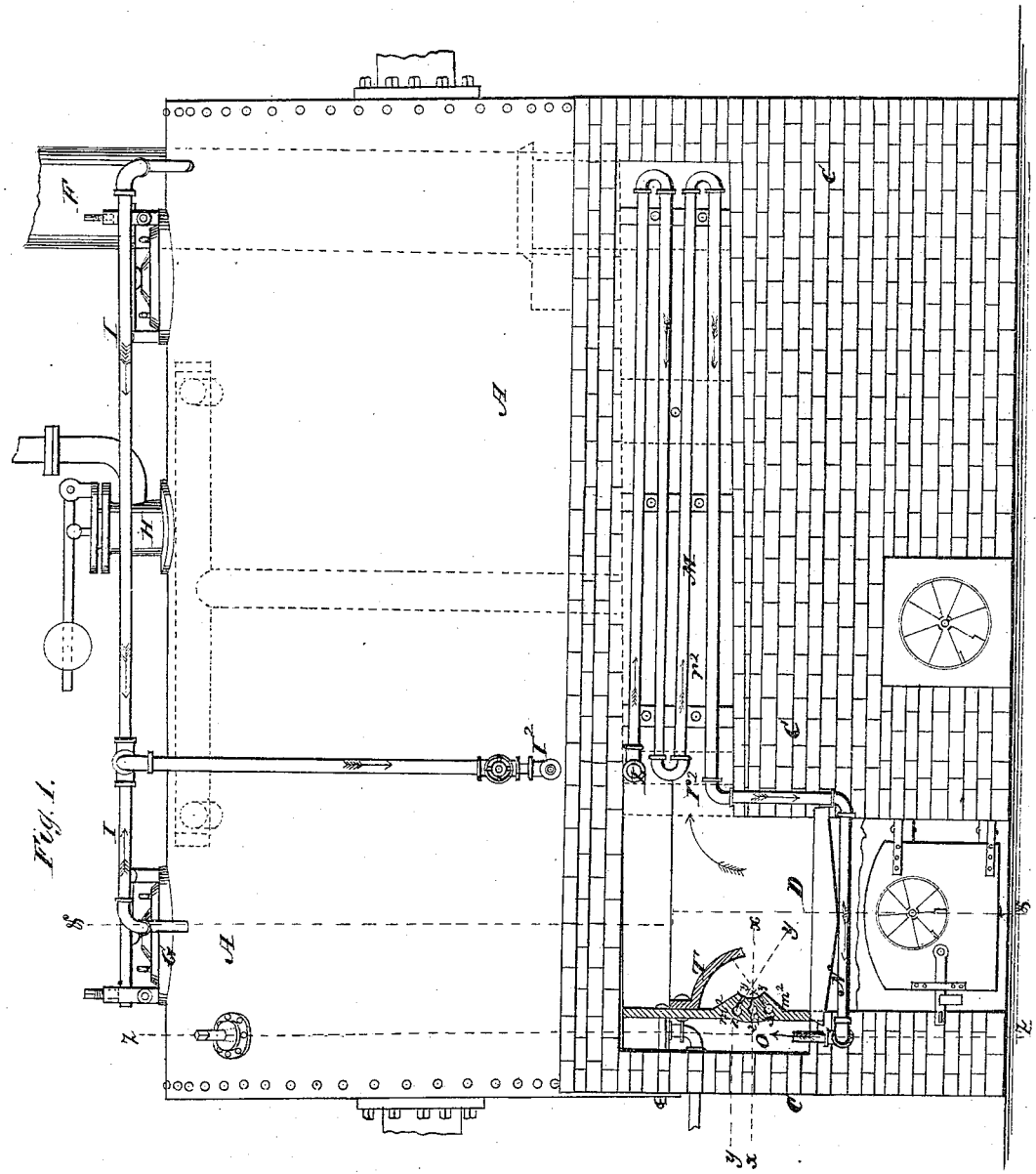
Witnesses:
E. Wolff
J. Felbel
Inventor:
M. J. Stein
By attorney
J. McIntire

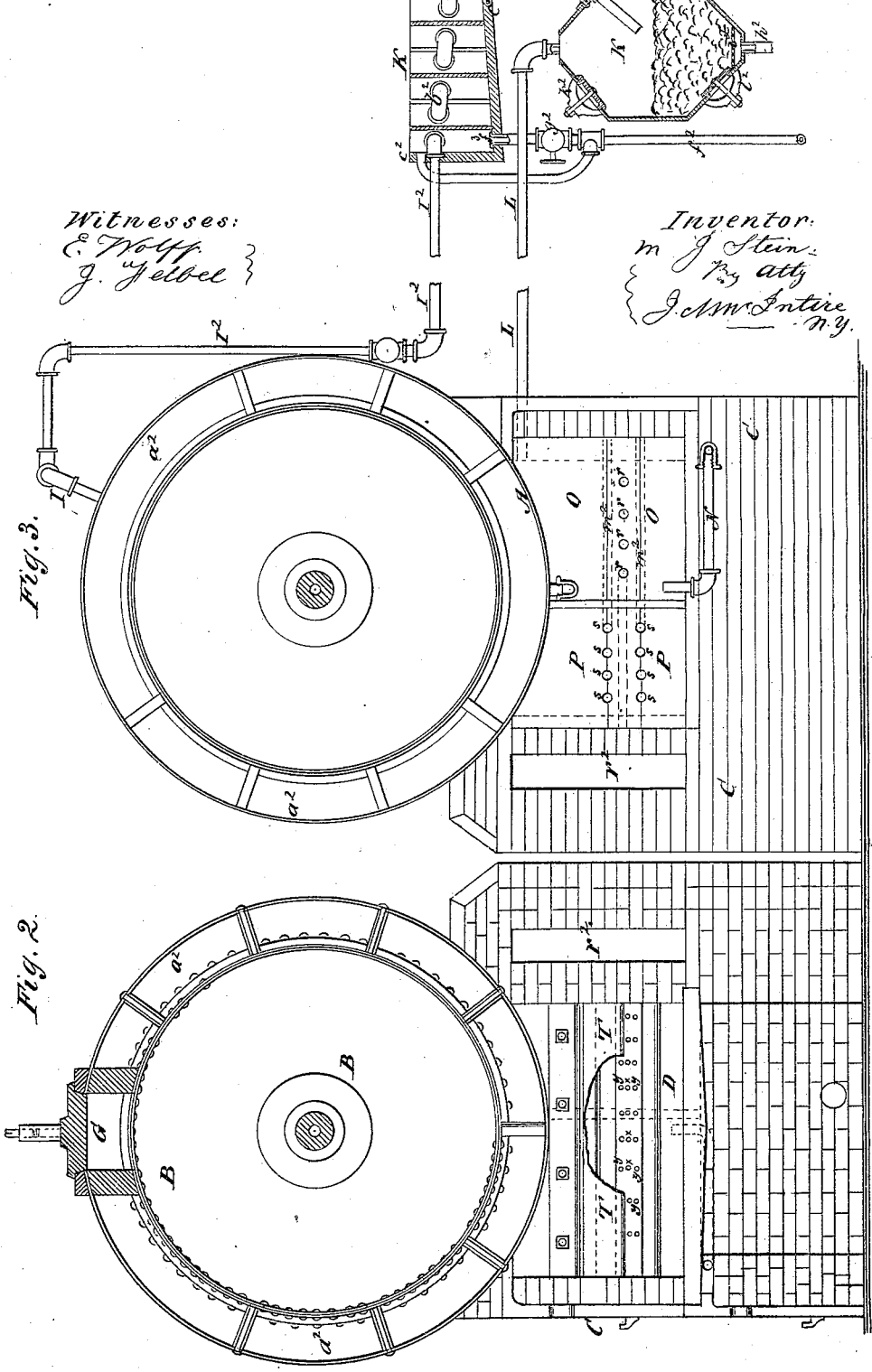

M. J. STEIN.
Improvement in Apparatus for Rendering and Drying
Animal Matters, and Burning the Gases.
No. 125,854. Patented April 16, 1872.

125,854

UNITED STATES PATENT OFFICE.

MICHAEL J. STEIN, OF NEW YORK, N. Y.

IMPROVEMENT IN APPARATUS FOR RENDERING AND DRYING ANIMAL MATTERS AND BURNING THE GASES.

Specification forming part of Letters Patent No. 125,854, dated April 16, 1872.

*To all whom it may concern:*

Be it known that I, MICHAEL J. STEIN, of New York city, in the county and State of New York, have invented certain new and useful Improvements in Apparatus for Carrying on the Processes of Rendering and Drying Animal Matters, and adapted to the practice or carrying on of other processes of cooking various materials, of distillation, &c.; and I do hereby declare the following to be a full, clear, and exact description of my said improvements, reference being had to the accompanying drawing and the letters marked thereon.

Figure 6:
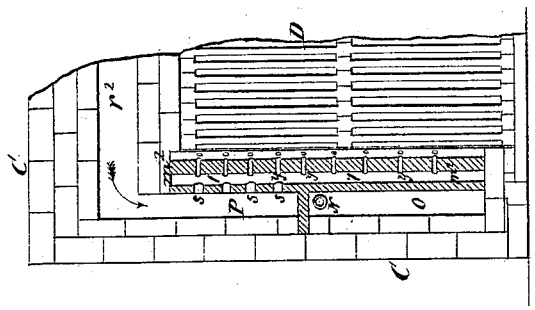
Figure 5:
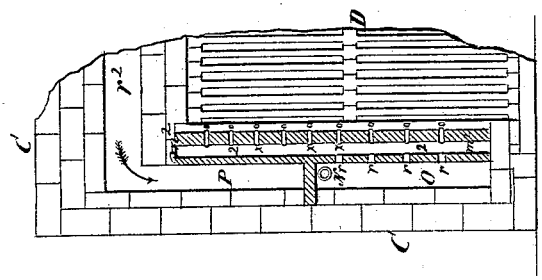
Figure 4:
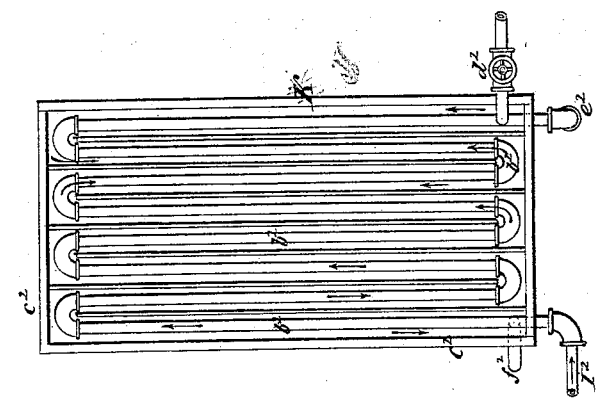

Figure 1 is a vertical longitudinal section of an apparatus embracing my improvements. Fig. 2 is a vertical cross-section of the same at the line $d$ $d$, Fig. 1. Fig. 3 is a vertical cross-section at $z$ $z$, Fig. 1. Fig. 4 is a detail plan view of the condenser, seen in vertical section at Fig. 3. Fig. 5 is a horizontal partial section at $x$ $x$, Fig. 1; and Fig. 6 is a similar section at the line $y$ $y$, Fig. 1.

In the several figures the same part is designated by the same letter of reference.

A represents an air-tight vessel or chamber made similar to such as is used for the rendering and drying of animal matters. It is composed of two cylinders of boiler iron connected by solid heads B B, and with an annular space, $a^2$, adapted to receive water and contain the generated steam for heating the contents of the inner cylinder or receptacle. This vessel A is mounted in suitable brick-work C, in which are the furnace D and suitable hot-air flues E, the latter connecting with a chimney or smoke-pipe, F, as shown. G G are the usual man-holes, for the introduction of the material to be operated upon, and H an ordinary safety-valve connected with the steam-space of chamber A in the usual manner. I I are tubes leading from the interior cylinder or the material-chamber of vessel A into a pipe, $I^2$, which extends to the condenser J, which I will presently describe. This condenser J communicates with a purifying-vessel or chamber, K, and from the latter extends a tube or pipe, L, which communicates with the superheater M, the pipe N of which extends into one of the chambers $o$ of a device or contrivance (which I will presently describe) for inducing to the destruction, by combustion in the furnace-fire, of the gases which pass from the chamber A, through the condenser and purifier, and thence to the superheater. The condenser J is composed of a coil, $b^2$, arranged in a slightly oblique or inclined plane, as shown, within a tank or vessel, $c^2$, which is kept supplied with cold water from a supply-pipe, $d^2$. The coil $b^2$ communicates with the purifier-chamber K by a pipe, $e^2$, and the tank $c^2$ is provided with an overflow or waste pipe, $f^2$, as clearly shown, to permit the water to pass off continuously as it is supplied constantly by the pipe $d^2$. This waste-pipe has a branch, $f^3$, which communicates with the bottom of the tank or condenser-vessel $c^2$, and is provided with a cock, $g^2$; and the bottom of tank $c^2$ is inclined downward to the point where pipe $f^3$ enters, so that, by opening cock $g^2$, the contents of $c^2$ may be entirely drawn off. The purifier K is composed of any suitably-shaped vessel which may be closed air-tight, and is provided with an exit-pipe, $h^2$, at its bottom, as shown. I prefer to make this vessel of about the shape shown. It is provided with one or more perforated plates or filters at $i^2$, and is filled partially from this plate or plates upward with charcoal or some other suitable filtering and purifying material, or combination of materials, through which the products of condensation, which enter at pipe $e^2$, pass or percolate. $k^2$ and $l^2$ are man-holes for the introduction and extraction of the material used in chamber K. They are made and operated in the usual manner. The pipe L, which extends from the upper part of the chamber K, communicates with the superheater M, as shown; and the pipe N, which passes, as before mentioned, to the gas-consuming contrivance, enters the latter at the chamber O. This device or contrivance for effecting the destruction of the gases in the furnace-fire is constructed as follows—viz.: extending vertically along one side of the fire-chamber of the furnace, from the grate-bars to the bottom of boiler or vessel A, is a partition, $m^2$, which separates the fire-chamber or furnace from a space or chamber formed by said partition between $m^2$ and the brick-work of the furnace; and this space or chamber is subdivided into two compartments, O and P, one of which, O, has communication, as before mentioned, with the superheater, through the medium of the pipe N, and the other of which, P, communicates, (see Figs. 5 and 6,) through the flue $r^2$, with the hot-air chambers of the furnace. Now, within an enlarged or thick portion of partition $m^2$, at a proper distance above the level of the grate-bars of the furnace, are formed three tubular holes, 1 2 3, (see Figs. 1, 5, 6,) which are located nearly over each other and about equidistant, and which extend in length nearly or quite the whole width of the partition $m^2$. These holes or tubular chambers 1 2 3 in the partition-plate $m^2$ are entirely disconnected, and each one of them communicates with a series of small holes which pass from it to the interior of the furnace-chamber. These holes, of course, are in horizontal lines, and they are made about equidistant, and the three rows so arranged that the holes of each come in vertical line with those of the others and form sets of three holes, as seen at Fig. 2, where $x$ represents the holes which form the communication between the central tube 2 and the fire-chamber of the furnace, and $y$ $y$ those which extend into the upper and lower tubes 1 and 3. The upper and lower series of holes are arranged obliquely, as seen at Fig. 2, while the central row of holes is in a horizontal plane. By this arrangement all the holes in the upper row and all the holes in the lower row converge as they pass from the tubes 1 and 3 to the furnace-chamber in such manner that their lines of direction intersect each other at a horizontal plane, through which the line of direction of the central row of holes passes, as indicated by the dotted arrows at Fig. 1. The object and operation of this arrangement of the three rows of holes $x$ and $y$ $y$ will be presently explained. The central tube 2 communicates, by means of four, more or less, passages, $r$, with the chamber or compartment O, and from this compartment said central tube and all its holes $x$ are supplied with superheated gas, which enters said chamber O through the pipe N; and the two upper and lower tubes 1 and 3 each communicate, by means of four, more or less, passages, $s$, with the chamber P, which is supplied with hot air from the flue $r^2$, and the hot air from said chamber consequently passes into and fills tubes 1 and 3 and escapes through the upper and lower rows of holes $y$ $y$, as and for purposes to be presently more fully explained. T is a deflector-plate, which is curved in cross vertical section, as seen at Fig. 1, and which extends the whole width of the partition $m^2$, as illustrated, (see Fig. 2.)

The operation of the apparatus so far described, as to its construction, will be understood from the following explanation: To carry on any ordinary rendering, drying, or other operation or combination of processes in my improved apparatus, the material is put into the vessel A, the furnace started, and steam-heat generated, all as usual. All the products of distillation and all gases evolved within the vessel A will pass off, under pressure, through the pipes I $I^2$, to the condenser, where they will be forced through the coil $b^2$, and from thence pass, through pipe $e^2$, into the chamber K of the purifier. In passing through the condenser the condensable vapors will be separated from the non-condensable vapors and gases, and will be discharged or will fall, in a liquid condition, into the purifier, where they will be filtered and purified, passing off at the pipe $h^2$, while the non-condensable vapors and gases will pass along, through the pipe L, to the superheater M, and thence, through tube N, to the chamber O. While the chamber O is supplied with a volume of highly-heated gas the chamber P is supplied with hot air, and, as this hot air and gas escape from these receivers or chambers O and P into the tubes, respectively, 2 and 1 3, of partition-plate $m^2$, the middle row of holes $x$ (see Figs. 1 and 2) feeds into the furnace jets of superheated gas from said chamber O, while the upper and lower rows of holes $y$ $y$ feed into said furnace jets of hot air, and the three jets of each set of upper, middle, and lower holes converging, as already explained, meet in the furnace-chamber, and, by a chemical action, a combustion is produced by their union and the destruction of the gases is effected. This is a great desideratum in the conduct of such processes as involve the generation within the vessel A of noxious gases, which would, without the use of some means to effectually destroy them, escape into the chimney and be a great nuisance, and detrimental to the health of any neighborhood in which the process might be carried on.

It will be observed that the construction and arrangements of the parts of the condensing apparatus are such, and, while the products of distillation enter it from and pass through it in one direction, the flow of water or the current of the cooling medium enters and passes through it in an opposite direction, as per arrows, Fig. 4. By this mode of operation the products of distillation are first brought into contact with the surfaces which are comparatively warm, and then successively into contact with colder surfaces, until the complete condensation of the condensable vapors is effected; and by this mode of operation I am enabled to effect a more thorough separation of the condensable from the non-condensable portions of the products that come from the vessel A, and insure the passage through the purifier to the superheater of all the gases which it is desirable should be destroyed. By the employment of the liquid purifier and filter I am enabled to purify and deodorize the condensed vapors as may be deemed expedient. The nature of the filtering and purifying materials to be used will, of course, depend much upon the character of the processes being conducted and the matter under treatment.

While I do not wish to limit my invention to any precise form of filter and purifier used in connection with a condenser, I do not wish to be understood as laying claim to the employment, in connection with any sort of vessel for carrying on a process of distillation, of a condenser. Neither do I wish to be understood as claiming the use, in connection with a furnace, and rendering or other chamber in which vapors and gases are generated, any device for bringing together the gases and currents of hot air to induce a combustion within the furnace, as I am aware that an "argand-burner" device has been employed for this purpose.

It will be seen that, by the arrangement of numerous small holes in a partition, $m^2$, as shown and described, I am enabled to bring all the gas and the hot air into perfect contact in numerous fine jets, converging into each other, and thus induce to a much more thorough chemical action and combustion than can be accomplished by the argand-burner device heretofore employed. By means of the deflector-plate T, I prevent any tendency of the escape upward of the issuing jets of air and gas which might prevent a perfect combustion and force slightly downward toward the bed of the fire the uniting or united currents; and, though I prefer to first superheat the gases which come from the condenser and purifier, it will be understood that the superheater may in some cases be dispensed with, and the non-condensable gases passed from the condenser right to the chamber O.

Having now so fully described the construction and operation of an apparatus embodying my several improvements that one skilled in the art can make and use my invention, what I claim as new, and desire to secure by Letters Patent, is—

1. In combination with a chamber or vessel for carrying on a heating operation, a furnace and a means for conducting the gases and vapors from said chamber to said furnace, an interposed condenser for separating the condensable from the non-condensable portions of the products of distillation, and permitting the passage to the furnace of only the non-condensable products, as and for the purposes set forth.

2. In combination with a heating-vessel and condenser, a purifying and filtering device, by means of which the condensed products may be purified and allowed to pass off separately from the non-condensed products, substantially as described.

3. A device or means to unite currents or jets of air and gas, or jets of different gases, for the purpose of producing combustion, composed essentially of one or more sets of passages, supplied from separate sources, and arranged to cause the separate jets conveyed through them to converge and impinge or come together, substantially as set forth.

4. In combination with a gas-burner and furnace, a deflector, arranged to operate substantially in the manner and for the purposes described.

In testimony whereof I have hereunto set my hand and seal this 26th day of March, 1872.

MICHAEL J. STEIN. [L. S.]

In presence of—
    J. FELBEL,
    J. MCINTIRE.